United States Patent [19]
Bryant

[11] 3,952,486
[45] Apr. 27, 1976

[54] RECIPROCATING MOWER SHOE ATTACHMENT

[76] Inventor: Elmer E. Bryant, Rte. No. 2, Townsend, Tenn. 37882

[22] Filed: Jan. 20, 1975

[21] Appl. No.: 542,169

[52] U.S. Cl. .............................................. 56/303
[51] Int. Cl.² ........................................ A01D 55/02
[58] Field of Search ............. 56/314, 320, 303, 296

[56] References Cited
UNITED STATES PATENTS

| | | | |
|---|---|---|---|
| 2,051,394 | 8/1936 | Reerer ................................. | 56/303 |
| 2,909,886 | 10/1959 | Stroburg et al. ..................... | 56/296 |
| 3,046,723 | 7/1962 | Young et al. ........................ | 56/314 |

*Primary Examiner*—Russell R. Kinsey
*Attorney, Agent, or Firm*—Fitch, Even, Tabin & Luedeka

[57] ABSTRACT

An attachment for a shoe of a reciprocating type mower. The attachment includes a generally planar upright shield mounted in substantially perpendicular relation to a generally planar rectangular blade terminating adjacent the outermost sickle knife in a terminal edge having serrations. The attachment blade coacts with the sickle blade to cut grass, hay and the like in the region adjacent to the shoe. The shield provides coverage of the slot in the shoe through which the outermost end of the sickle blade passes in its reciprocatory movement. The attachment minimizes accumulation of cuttings which reduce mower efficiency.

2 Claims, 4 Drawing Figures

RECIPROCATING MOWER SHOE ATTACHMENT

This invention relates to an attachment for a shoe of a reciprocating mower and more particularly to such an attachment adapted to prevent clogging of the slot in the shoe through which the outermost end of the sickle blade passes in its reciprocatory movement.

One common type of reciprocating mower of the kind used to cut grass, hay, weeds and the like includes a sickle mounted in outrigger fashion on the mower with the outboard end of the sickle being supported by a shoe which slidably engages the ground during mowing operations. This shoe normally is provided with a slot through which the sickle blade with its knives is passed when assemblying the blade on the sickle. Also, the outermost end of the sickle blade moves within this slot during reciprocating cutting movement of the blade. Cuttings and other debris in the region adjacent to the shoe tend to lodge in the slot and between the outermost end of the sickle blade and the shoe face as the sickle blade reciprocates, thereby impeding or preventing the lateral movement of the sickle blade, hence reducing the cutting efficiency of the mower.

It is therefore an object of this invention to provide an attachment for a shoe of a reciprocating mower which reduces the possibility of cuttings or other debris from clogging the shoe slot through which the sickle blade passes in its reciprocatory movement.

It is another object of this invention to provide a mower shoe attachment of the kind described having an upright shield portion for coverage of the shoe slot and a horizontal blade portion for coverage of the shoe slot and a horizontal blade portion which coacts with the outermost end of the sickle to cut grass in the region adjacent to the shoe.

It is another object of this invention to provide a mower shoe attachment of the kind described which has a universal mounting feature.

These and other objects of the invention will become apparent from a reading of the following specification and claims, taken together with the accompanying drawings, wherein like parts are referred to and indicated by like numerals, except where otherwise indicated, and wherein:

Figure 1:
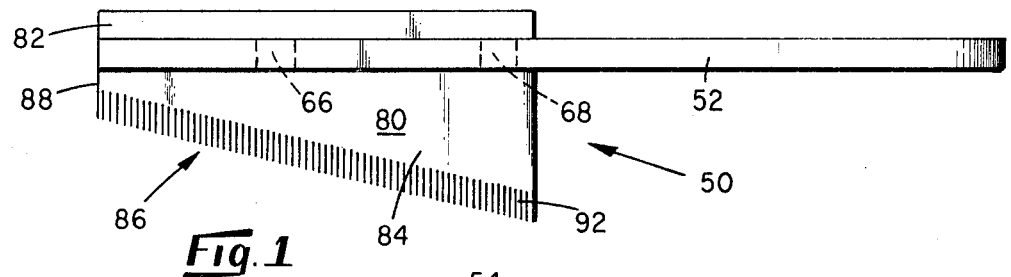
FIG. 1 is a top view, showing a mower shoe attachment embodying various features of the invention.

In accordance with this invention, there is provided an attachment for a shoe of a reciprocating type mower. The attachment includes a generally planar upright shield mounted in substantially perpendicular relation to a generally planar rectangular blade terminating adjacent the outermost sickle knife in a terminal edge having serrations. The attachment blade coacts with the sickle blade to cut grass, hay and the like in the region adjacent to the shoe. The shield provides coverage of the slot in the shoe through which the outermost end of the sickle blade passes in its reciprocating movement. The attachment minimizes accumulation of cuttings which reduce mower efficiency.

Referring to the FIGS., the sickle 10, in the usual manner of a reciprocating mower assembly, includes a sickle blade 12 mounted for reciprocating movement on a beam 14. The sickle blade 12 includes a plurality of sickle knives 16 mounted as by rivets 17, on a sickle bar 18 which is supported by fingers 20 extending from the beam 14 and defining slots 21 through which the knives slidably reciprocate.

The depicted sickle includes a shoe 22 secured to the outer end 24 of the beam 14, to maintain the beam 14 above the surface such as the ground, over which the shoe 22 slides when the mower is in operation and the sickle is advanced for cutting purposes.

Figure 3:
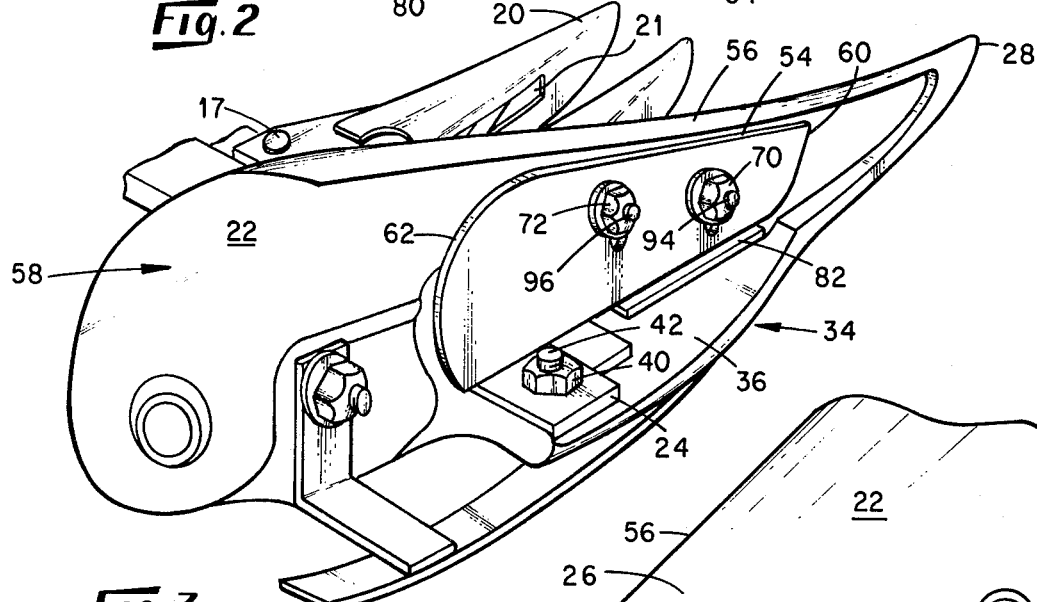
FIG. 3 is a perspective view of the attachment of FIG. 1 as mounted on a shoe and viewed from the outermost side of the shoe.
Figure 4:
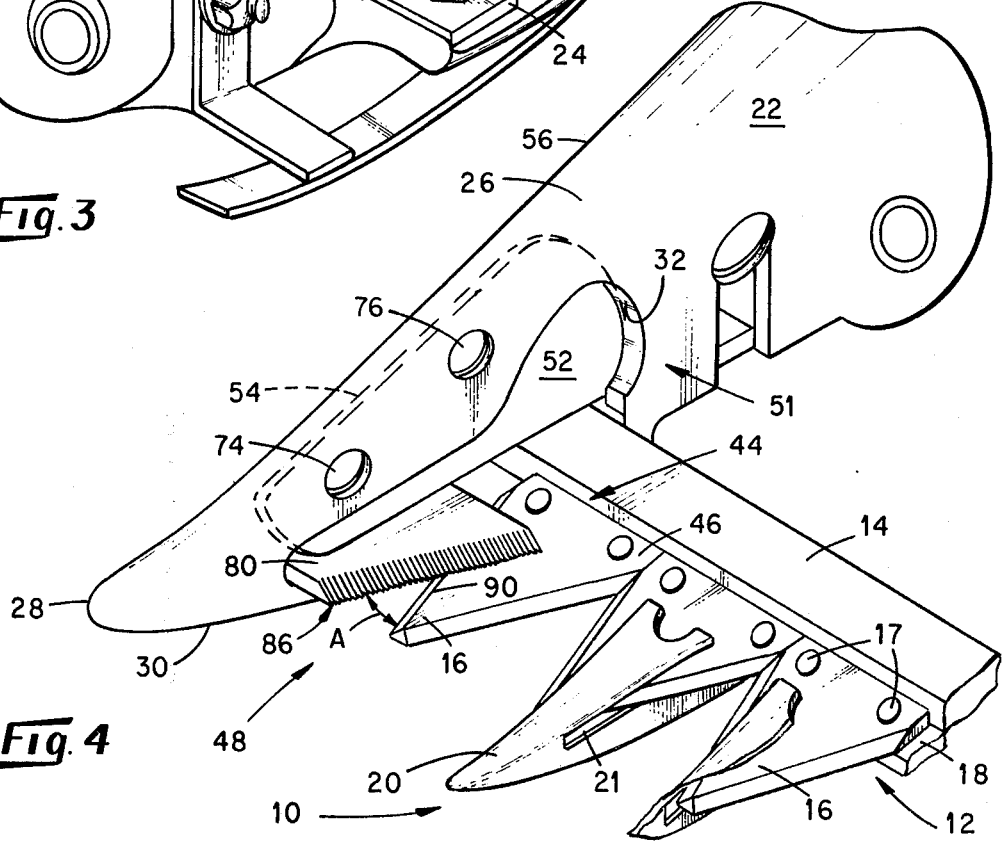
FIG. 4 is a perspective view of the attachment of FIG. 3 viewed from the sickle side of the shoe.

The shoe 22, as depicted in FIGS. 3 and 4, comprises a generally upright, generally planar body portion 26, the leading edge 28 of which is pointed to facilitate movement of the sickle through grass, weeds, etc. Substantially centrally of the longitudinal dimension of the body portion 26 and adjacent its bottom edge 30, there is provided a generally arcuate elongated slot 32. The shoe 22 defines a saddle 34 adjacent the bottom portion of the slot 32 including a generally horizontal planar surface 36 which receives the outboard end of the sickle beam thereon. This outboard end 24 of the sickle beam is secured to this table portion as by means of a nut 40 and bolt 42 thereby securing the shoe 22 in a generally upright position.

In assembling the sickle, the sickle blade 12 is inserted through the slot 32, with the sickle knives 16 entering the slots 21 of the fingers. The inboard end (not shown) is attached to the mower power source in a conventional manner for reciprocation, such connection not being an element of the present invention. By virtue of its mounting, as the sickle blade 12 reciprocates, it moves within the slot 32 in the upright body portion 26 of the shoe 22.

Further, as the sickle bar 18 reciprocates, it carries the knives 16 back and forth through the fingers 20 in a scissoring action on opposite sides of each of the fingers 20. The outboard end 44 of the sickle blade 12 including the outermost sickle knife 46 pass back and forth through the elongated slot 32 in the shoe as noted above. Heretofore, in a cutting operation, cuttings from the region 48 adjacent to the shoe tended to become lodged in the slot 32 and against the inner face 51 of the shoe 22, and resisted or prevented the reciprocating movement of the sickle blade 12 within the slot, thereby reducing the cutting efficiency of the mower.

In the disclosed mower shoe attachment 50 there is provided a generally upright planar shield portion 52 adapted for covering the region of the slot 32, except for the bottom portion of the slot 32 within which end 24 of the beam 14 resides and within which the outboard end 44 of the sickle blade reciprocates.

In the preferred embodiment, the shield 52 is generally planar and of a size sufficient to substantially cover the slot 32 to the desired extent as referred to above. The depicted shield includes a top edge 54, which follows the contour of the top edge 56 of the shoe, and is adapted to fit generally flush with such top edge 56 of the shoe. As necessary, the shield 52 is bent or sloped to conform with the outermost face 58 of the shoe 22 and substantially seal the covered portion of the slot 32. The depicted attachment further includes an arcuate forward edge 60 and arcuate rear edge 62 joining the top edge 54 with a straight lower edge 64.

Figure 2:
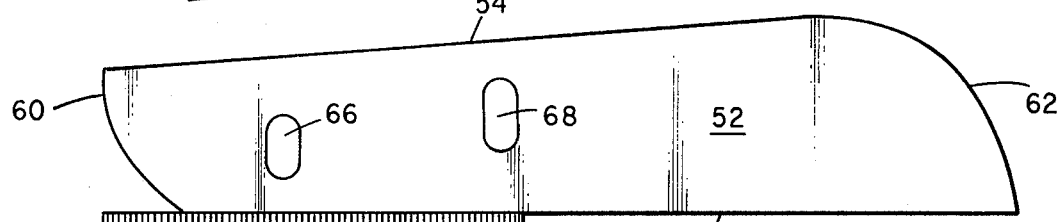
FIG. 2 is an elevation view of the attachment of FIG. 1.

Two vertically elongated holes 66 and 68 are provided toward the forward arcuate edge 60 of the attachment as shown in FIG. 2. These holes 66 and 68 register with further holes (not shown) provided in the body portion 26 of the shoe 22 when the attachment is properly positioned in covering relation to the slot 32. Fastening means, such as nuts 70 and 72 and bolts 74 and 76 are threaded through the registering holes to mount the attachment on the shoe. Selection of the vertical position of the attachment 50 with respect to the slot 32 is accomplished by adjusting the position of the bolts 74 and 76 within the elongated holes 66 and 68.

In the depicted attachment, a generally rectangular planar blade portion 80 is fixedly mounted on the forward portion of lower edge 64 of the shield 52 by suitable means, such as welding with the plane of the blade 80 positioned horizontally and in general perpendicular relation with the upright shield 52. This blade 80 extends on both sides of the shield 52 as shown in FIG. 1 and includes an outer section 82 of the blade 80 section 84 that extends inwardly through the slot 32 in the shoe 22 and is disposed in cantilevered fashion above and in cutting relation to the outer knife 46 of the sickle blade 12. As shown in FIG. 4, the inner section 84 of the blade 80, extends through the slot 32 in the shoe 22 and is disposed in cutting relation with and in cantilevered relationship to the outermost sickle knife at a location spaced apart from means, i.e. rivets 17, mounting the outermost sickle knife 44 on the sickle bar 18.

In the preferred embodiment, the inner side edge of the blade portion 82 defines a cutting edge 86. The depicted cutting edge 86 is beveled on its upper side and diverges inwardly of the sickle from its leading edge 88 thereby orienting this cutting edge at an acute angle A with respect to the outer cutting edge 90 of the knife 46. This cutting edge 90 preferably is serrated to coact with the knife 46 of the sickle blade 12 to cut grass, weeds, etc. in the region 48 adjacent to the shoe 22. These serrations 92 of the beveled cutting edge 86 aid in holding grass or weed stems, etc. within the "V" shaped cutting region 96 between blade 80 and the outer knife 46 as the sickle knife 46 reciprocates under the attachment blade 80, thereby increasing the cutting efficiency of the mower in the region 48 adjacent to the shoe.

As shown in FIGS. 3 and 4 and referred to hereinbefore the mower shoe attachment 50 is secured to the upright body portion of the shoe 22 by means of bolts 74 and 76 having shafts 94 and 96 with threaded end portions which pass through the elongated holes 66 and 68 in the shield 52 and registering circular holes in the shoe 22. In addition to providing for the selective positioning of the shield 52 with respect to the slot 32 in the shoe 22 the elongated holes 66 and 68 provide selectable positioning of the blade portion 84 of the attachment 50 in cutting relation with the outer cutting knife 46 of the sickle blade 12. When the desired vertical position of the attachment 50 is selected, fasteners such as nuts 70 and 72 may then be secured to the threaded end portion of the bolts 74 and 76 to hold the shield 52 and blade 80 in a fixed position relative to the shoe 22.

When the mower is in operation with the present attachment 50 secured on the shoe thereof, the shield 52 seals the slot 32 in the shoe 22 against the accumulation of cuttings or other debris in the slot 32 thereby keeping the slot 32 open for reciprocation of the sickle blade 12 therethrough. In addition, the blade 80 is positioned above the sickle knife 46 and coacting therewith, serves to cut grass, weeds and the like in the region 48 adjacent to the shoe slot 32 which heretofore were uncut, but which were caught between the outer knife 46 and the shoe face 51 and developed a severe drag on the outboard end of the sickle. The combined effects of sealing the slot 34 and cutting the weeds, etc. in the region adjacent to the shoe causes the cuttings to pass over the sickle 10 as it is moved over the supporting surface with resultant increased efficiency of the mowing operation.

The attachment of the present invention is adapted for universal fit on the shoes of known reciprocating mowers. Holes spaced to receive the mounting bolts 74 and 76 extending through the elongated holes in the shield may readily be drilled in the body portion of the mower shoe, if not otherwise provided. The vertically elongated holes in the shield portion of the attachment allow the blade to be adjusted in the vertical direction to seal the slot in the shoe and to position the blade portion of the attachment in proper coacting relationship to the sickle blade.

While a preferred embodiment has been shown and described, there is no intent to limit the invention by such disclosure, but rather, it is intended to cover all modifications and alternative constructions falling within the spirit and scope of the invention as defined in the appended claims.

What is claimed is:

1. An attachment in combination with a shoe of a reciprocating type mower having a reciprocating sickle blade including sickle knives mounted on a sickle bar, said shoe having a generally upright portion in which there is provided a slot through which the outermost end portion of the sickle blade together with the outermost sickle knife passes during its reciprocatory movement, said attachment including a generally planar upright shield disposed in substantially parallel relationship to said shoe and covering said slot in said shoe, said shield defining vertically oriented elongated holes in said shield, means adjustably received in said holes and releasably mounting said shield on said shoe in a selectable vertical position relative to said slot in said shoe, and a generally rectangular planar blade mounted in substantially perpendicular relation to said shield on the lower edge of said shield and extending therefrom and through said slot in said shoe and disposed in cantilevered relationship to said outermost sickle knife at a location spaced apart from means mounting said sickle knife on said sickle bar, said blade terminating adjacent the outermost sickle knife in a cutting edge having serrations along the length thereof and coacting with said sickle knife for performing a cutting function.

2. The blade of claim 1 with said cutting edge sloped to define a "V" shaped cutting region with the said outermost knife of said sickle when said attachment is mounted on said shoe.

* * * * *

UNITED STATES PATENT OFFICE
CERTIFICATE OF CORRECTION

Patent No. 3,952,486   Dated April 27, 1976

Inventor(s) Elmer E. Bryant

It is certified that error appears in the above-identified patent and that said Letters Patent are hereby corrected as shown below:

Column 3, line 19, after 80, insert -- and an inner --.

Signed and Sealed this

Thirteenth Day of July 1976

[SEAL]

Attest:

RUTH C. MASON
*Attesting Officer*

C. MARSHALL DANN
*Commissioner of Patents and Trademarks*